United States Patent [19]
Buoniconti et al.

[11] Patent Number: 6,030,705
[45] Date of Patent: *Feb. 29, 2000

[54] POLYCARBONATE FILM FOR COVERING COUNTERTOPS

[75] Inventors: Ralph R. Buoniconti, West Springfield, Mass.; John F. Tryon, Houston, Tex.

[73] Assignee: General Electric Company, Pittsfield, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/977,566

[22] Filed: Nov. 25, 1997

Related U.S. Application Data

[63] Continuation of application No. 08/606,790, Feb. 27, 1996, abandoned.

[51] Int. Cl.[7] ............................. B32B 27/36; B32B 21/14

[52] U.S. Cl. ................... 428/412; 428/542.2; 428/542.6
[58] Field of Search ................... 428/412, 40.1, 428/343, 355 AC, 542.2, 542.6

[56] References Cited

U.S. PATENT DOCUMENTS

| Re. 24,906 | 12/1960 | Ulrich ................................ 428/343 |
| 4,387,129 | 6/1983 | Vincent ............................ 428/355 X |
| 4,514,464 | 4/1985 | Gomez ............................. 428/412 X |
| 5,002,326 | 3/1991 | Westfield et al. . |
| 5,480,698 | 1/1996 | Hayman-Chaffery ............... 428/412 X |
| 5,624,737 | 4/1997 | Fairbanks et al. ....................... 428/198 |

FOREIGN PATENT DOCUMENTS 2 048 167   4/1979   United Kingdom .

*Primary Examiner*—Daniel Zirker

[57] ABSTRACT

A film of a polycarbonate resin is adhered to a counter top surface to obtain a durable work surface.

6 Claims, 1 Drawing Sheet

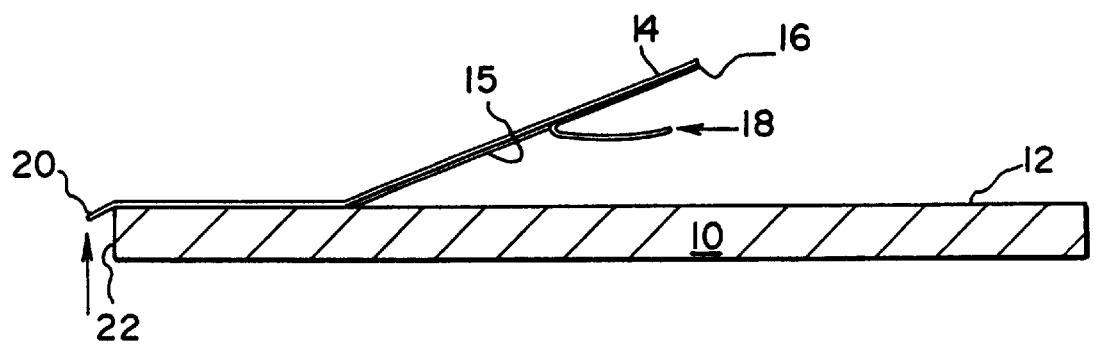

POLYCARBONATE FILM FOR COVERING COUNTERTOPS

This is a continuation of application Ser. No. 08/606,790 filed on Feb. 27, 1996, now abandoned.

BACKGROUND OF THE INVENTION

1. Field of the Invention

The invention relates to countertop surfacing and more particularly to a method and construction for applying a polycarbonate surface to countertops.

2. Brief Description of Related Art

Countertops are universally found in a wide variety of work places, including offices, kitchens, laboratories and like places for the convenience of carrying on various work procedures. In high use procedures under some operating conditions, countertops may require frequent replacement or rehabilitation. Current methods of replacement or retrofitting of countertops may require sanding of a worn surface, adhering a new surface and re-routing exposed edges. The adhering step alone may require the use of relatively messy gluing procedures that require set-up times before a final cure is achieved. Depending on the technique, the whole process can be very time consuming and a sophisticated skill is required.

By the process of the present invention, a scratched or worn countertop may be rehabilitated with minimal effort and skills by covering the worn surface with a film of polycarbonate. New surfaces may also be covered with the film.

SUMMARY OF THE INVENTION

The invention comprises a flexible film of a polycarbonate resin, having an upper surface and a lower surface; and a layer of a pressure-sensitive laminating adhesive on the lower surface.

The flexible film is applied, according to the method and process of the invention to a countertop substrate, whereby a durable work surface is obtained.

BRIEF DESCRIPTION OF THE DRAWING

The accompanying drawing is a cross-sectional side elevation of a polycarbonate film bearing a pressure-sensitive laminating adhesive for attachment to a countertop substrate, being applied to a countertop substrate according to the method of the invention.

DETAILED DESCRIPTION OF THE PREFERRED EMBODIMENTS OF THE INVENTION

Those skilled in the art will gain an understanding of the method and article of the invention from a reading of the following description of the preferred embodiment, when read in conjunction with a viewing of the accompanying drawing.

The accompanying drawing is a cross-sectional side elevation of a counter 10 which may be fabricated from particle board, high pressure laminate (wood, fiberglass or synthetic polymer) or like conventional counter material. According to the method of the invention, as a preliminary step, one thoroughly cleans the counter surface 12 to remove any dirt, dust, or other contaminates that may prevent a good bond with adhesive. If any cleaners are used, water-wash the residual cleaner from the counter. Wipe counter surface down with clean, dry cloth.

In an initial step according to the method of the invention, one provides a sheet or film 14 of flexible, polycarbonate resin bearing on the lower surface 16 a coating of pressure-sensitive laminating adhesive 15, temporarily covered and protected with a removable, peel-away backing paper 18 (shown partially peeled away in the drawing).

Polycarbonate resins are the reaction products of aromatic dihydroxy compounds with a polycarbonate precursor, such as phosgene. As thermoplastic resins, they are readily molded in sheets and films by known techniques. One common technique is to cast the molten resin onto an extrusion roll stack and both sides of the film are polished and pressed to a uniform thickness. generally the films formed will have a thickness of from about 0.5 to 30 mils. Representative of polycarbonate resins and their thermoforming into sheets and films are the descriptions given in the U.S. Pat. Nos. 3,161,615; 3,220,973; 3,312,659; 3,312,660; 3,313,777; 3,666,614; 3,989,672 and 4,351,920 which are all incorporated herein by reference thereto. Preferred films of polycarbonate resins are commercially available under the trademark LEXAN® from General Electric Company, Pittsfield, Mass. (see product data sheet SPO-52018:3/94).

To fit the film 14 to the counter 10 surface 12, the operator or installer scribes and cuts film 14 with adhesive coating 15 to allow about a 1" overlap 20 over all side edges 22 of the counter 10.

Starting from one edge 22, peel backing paper from the sheet or film 14 to expose approximately 24" of adhesive layer 15. Press and adhere film 14 to one edge 22. By holding film 14 slightly away from counter 10 and using a firm squeegee, ensure the adhesive 15 is pressed firmly to the counter 10 and trapped air bubbles are eliminated. While working across the counter, peel backing paper 18 away to expose more adhesive 15 as needed. NOTE: The adhesive is aggressive and sticks quickly. A narrow area of initial contact with firm pressure should help eliminate any trapped air bubbles. Alternatively, some may find it easier to eliminate trapped air bubbles by first wetting the counter 10 surface 12. A dilute soap solution (several drops of mild liquid soap in a pint of water) should be liberally sprayed on the surface 12. As the film 14 is applied, the wet surface allows for movement and re-positioning. The squeegee, with pressure, can be used to remove the trapped liquid. With film 14 in place adhesively adhered to the counter 10 surface 12, the installer scribes and cuts the overlap 20 to fit the vertical edges 22. NOTE: This step may not be necessary if edge strips are pre-cut and included with surface material as a "kit".

Adhere the film 14 to vertical edges 22 ensuring a tight "corner seam" with the overhanging counter top film 14.

Using a laminate router/trimmer, trim away the excess overhang 20 of film 14. The resulting edge should be straight, smooth, and fully adhered to the substrate surface. NOTE: If necessary, the edge of the film 14 can be draw filed to produce a smooth, flush surface.

If peeling away of film 14 becomes necessary, remove any adhesive 15 remaining on laminate substrate by scraping with a sharp wood chisel.

Although any pressure-sensitive laminating adhesive may be used to adhere the film 14 to the surface 12 of counter 10, preferred for its compatibility with polycarbonate resin films and the use contemplated, we find advantageous the acrylic adhesives. Commercially available pressure-sensitive laminating adhesives of this type include Scotch® brand 468 MP adhesive (3M Company, Minneapolis, Minn.).

The invention as quickly carried out and easily replaceable counter-top construction uses LEXAN® 8B35 Film as the first surface. The clear film can be printed on the (protected) second surface, allowing an infinite variety of colors or messages to be displayed. The film is then adhered to a "standard" countertop construction, advantageously using any high-pressure laminate as a substrate.

The invention solves several problems. In high-abuse areas, countertops may need replacing frequently. Current methods of replacing or retrofitting high pressure laminates involve sanding of the laminate surface, adhering the new surface, and finally routing the edges. The adhering step alone uses relatively messy gluing procedures that require set-up times before final cure. The sanding step can be equally messy. Depending upon technique, the whole process can be fairly time consuming. With the LEXAN® film product, a scratched or worn high-pressure laminate surface can be left unsanded.

The adhering step is quick, there is no set-up time for the adhesive, and the routing is faster and cleaner than with typical laminates. The textured LEXAN® surface minimizes scratching and other surface abuses.

The adhesive used is strong enough to resist peel-up, unless deliberate, strong force is used. If replacement is needed, adhesive that remains on the high-pressure laminate surface after the film is peeled away can be removed using a wood chisel. This removal step is done with the same ease as stickers are removed from glass with a razor blade.

Also, any decorative graphics used for the countertop are protected by decorating the back surface of the film. These decorative graphics can be anything from a single, solid color to screenprinted advertising. The following example shows the manner and process of carrying out the invention but is not to be construed as limiting.

EXAMPLE

To a substrate of a high pressure laminate there was adhered through the agency of a pressure-sensitive acrylic resin (Scotch® 468 MP high performance adhesive) a 0.020 inch thick film of LEXAN® 8B35 film (General Electric Company, Pittsfield, Mass.).

The polycarbonate film covered countertop exhibits a durable, attractive work surface.

Repeating the above procedure, but applying the same film to a non-combustible substrate (cement board) there was obtained a polycarbonate film covered countertop which, when tested for flammability according to ASTM test method E-84-94, meets the requirement for a Class A Interior Wall and Ceiling Finish (flame spread of 5 and a smoke developed value of 40).

Other thermoplastic resins useful in the present invention are polyesters such as polyethyleneterephthalate, polybutyleneterephthalate, polyethyleneterephthalate with glycol, as well as polyvinylfluoride, polyamide, polyvinylidenefluoride, polyvinylchloride, acrylonitrile-butadiene-styrene and blends thereof with each other or with polycarbonate or acrylics or polyphenylene ether.

What is claimed is:

1. A countertop consisting essentially of a thermoplastic resin film selected from the group consisting of polycarbonate, polyester, polyamide, polyvinyl chloride, acrylonitrile-butadiene-styrene, polyvinylfluoride, polyphenylene ether, polyvinylidene fluoride and blends thereof and having an upper surface and a lower surface and a countertop substrate wherein a layer of a pressure sensitive adhesive is interposed between the lower surface of said film and said countertop substrate, said upper surface of said film is clear or textured, provided that when said upper surface is clear said lower surface has printed thereon a color or a message which is visible through said flexible thermoplastic film.

2. The countertop of claim 1 wherein the thermoplastic film has a thickness of about 0.5 to 30 mils.

3. The countertop of claim 2 wherein the pressure sensitive adhesive is an acrylic resin.

4. The countertop of claim 3 wherein the thermoplastic resin film is a polycarbonate resin.

5. A process of applying a flexible thermoplastic resin film to a counter to form a countertop which process consists essentially of:

providing a high-pressure laminate countertop having a work surface;

providing a flexible thermoplastic resin film selected from the group consisting of polycarbonate, polyester, polyamide, polyvinyl chloride, acrylonitrile-butadiene-styrene, polyvinylfluoride, polyphenylene ether, polyvinylidene fluoride and blends thereof and having an upper surface and a lower surface which upper surface is clear or textured, provided that when said upper surface is clear, said lower surface has printed thereon a color or a message which is visible through said flexible thermoplastic film; and adhering the lower surface of the film to the work surface of the countertop with a layer of a pressure sensitive adhesive.

6. The process of claim 5, wherein the thermoplastic resin is a polycarbonate.

* * * * *